(12) United States Patent
Dantressangle et al.

(10) Patent No.: US 10,572,494 B2
(45) Date of Patent: *Feb. 25, 2020

(54) BOOTSTRAPPING THE DATA LAKE AND GLOSSARIES WITH 'DATASET JOINS' METADATA FROM EXISTING APPLICATION PATTERNS

(71) Applicant: INTERNATIONAL BUSINESS MACHINES CORPORATION, Armonk, NY (US)

(72) Inventors: Patrick Dantressangle, Chandlers Ford (GB); Simon Laws, Liss (GB); Adrian C. F. Lee, Stockbridge (GB); Peter Wooldridge, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/719,903

(22) Filed: Sep. 29, 2017

(65) Prior Publication Data

US 2018/0025061 A1    Jan. 25, 2018

Related U.S. Application Data

(63) Continuation of application No. 14/669,096, filed on Mar. 26, 2015, now Pat. No. 9,959,324.

(51) Int. Cl.
*G06F 16/20* (2019.01)
*G06F 16/2458* (2019.01)

(52) U.S. Cl.
CPC .............................. *G06F 16/2465* (2019.01)

(58) Field of Classification Search
None
See application file for complete search history.

(56) References Cited

U.S. PATENT DOCUMENTS 5,715,468 A    2/1998  Budzinski
6,295,529 B1 *  9/2001  Corston-Oliver ........................... G06F 17/2211
                                                       707/715

(Continued)

FOREIGN PATENT DOCUMENTS

CN       1941743 A    4/2007
CN     101621480 A    1/2010

(Continued)

OTHER PUBLICATIONS

Composite Software, "Composite Discovery," Data Sheet, 2012, 2 Pages, Version 6.2, Composite Software, Inc.

(Continued)

*Primary Examiner* — Belix M Ortiz Ditren
(74) *Attorney, Agent, or Firm* — Kristofer L. Haggerty

(57) ABSTRACT

A method to search for at least one relationship pattern in a plurality of runtime artifacts is provided. The method may include detecting at least one data manipulation statement in the plurality of runtime artifacts. The method may also include extracting at least one relationship clause from the detected at least one data manipulation statement. The method may further include parsing the extracted at least one relationship clause. The method may include generating at least one normalized syntax tree based on the parsed at least one relationship clause. The method may also include performing a classification and a snippet discovery on the generated at least one normalized syntax tree.

20 Claims, 5 Drawing Sheets

(56) References Cited

U.S. PATENT DOCUMENTS

| | | | |
|---|---|---|---|
| 7,707,143 | B2 | 4/2010 | Bruce et al. |
| 7,716,167 | B2 | 5/2010 | Colossi et al. |
| 7,788,238 | B2 | 8/2010 | Gabriel et al. |
| 7,865,505 | B2 | 1/2011 | Arasu et al. |
| 8,117,190 | B2 | 2/2012 | Koudas et al. |
| 8,190,992 | B2 | 5/2012 | Tien et al. |
| 8,401,982 | B1 | 3/2013 | Satish et al. |
| 8,453,130 | B2 | 5/2013 | Benjamin et al. |
| 8,539,050 | B2 | 9/2013 | Tow et al. |
| 8,676,859 | B2 | 3/2014 | Sayal et al. |
| 8,856,085 | B2 | 10/2014 | Gorelik |
| 9,535,927 | B2 | 1/2017 | Bursey |
| 9,959,324 | B2 | 5/2018 | Dantressangle et al. |
| 2009/0271179 | A1 | 10/2009 | Marchisio et al. |
| 2014/0067790 | A1 | 3/2014 | Lipin |
| 2015/0356094 | A1 | 12/2015 | Gorelik |
| 2016/0094572 | A1* | 3/2016 | Tyagi ............... H04L 63/1425 726/23 |
| 2016/0253340 | A1 | 9/2016 | Barth et al. |
| 2016/0283569 | A1 | 9/2016 | Dantressangle et al. |
| 2016/0314202 | A1 | 10/2016 | Gomadam et al. |
| 2019/0005163 | A1* | 1/2019 | Farrell ............... G06F 17/509 |
| 2019/0034189 | A1* | 1/2019 | Gass ............... G06F 8/443 |

FOREIGN PATENT DOCUMENTS

| | | |
|---|---|---|
| CN | 101794224 A | 8/2010 |
| CN | 104462356 A | 3/2015 |
| CN | 104462497 A | 3/2015 |
| CN | 106021260 A | 10/2016 |

OTHER PUBLICATIONS

Gorelik, "IBM InfoSphere Discovery: The Next Generation of Data Analysis," IBM developerWorks, Jun. 17, 2010, p. 1-20, IBM Corporation.

Swanstrom, "What is a 'Data Lake'?," Data Science 101: Learn Data Science, Mar. 12, 2014, p. 1-2, http://101.datascience.community/2014/03/12/what-is-a-data-lake/, Accessed on Mar. 13, 2015.

Ge et al., "Multiple Query Optimization System Based on Cloud Computing," Computer Engineering, Sep. 2014, 6 Pages, vol. 40, No. 9, English Abstract.

IBM, "List of IBM Patents or Patent Applications Treated as Related (Appendix P)," Feb. 13, 2019, p. 1-2.

Srikumar et al., "Extraction of Entailed Semantic Relations Through Syntax-based Comma Resolution," Proceedings of ACL-08: HLT, Jun. 2008, p. 1030-1038, Association for Computational Linguistics, Columbus, Ohio, USA.

* cited by examiner

BOOTSTRAPPING THE DATA LAKE AND GLOSSARIES WITH 'DATASET JOINS' METADATA FROM EXISTING APPLICATION PATTERNS

BACKGROUND

The present invention relates generally to the field of computers, and more particularly to big data platforms.

Big data describes data sets that are so large or complex that they are difficult to process using traditional data processing applications. Challenges include analysis, capture, curation, search, sharing, storage, transfer, visualization, and information privacy. A data lake is a parallel system able to store big data as well as a system able to perform computations on the data without moving the data. The theory behind data lakes, data reservoirs or enterprise data Hubs, is that big data platforms will receive, integrate or federate multiple data sets originated from sources such as, a relational database management system (RDBMS), extract, transfer load (ETL), data warehouses, a system of records, flat files (e.g., CSV, XML, etc.), and master database management (MDM). Additionally, many more data sets may come from multiple data channels, such as social media, clickstreams, and sensor data. A data lake doesn't need to be located on one big data cluster, but rather, it can span multiple machines and domains as long as it is managed as one single entity. However, for example purposes only, the present embodiment may be discussed herein with respect to a single Big Data platform. When the data is located on that one platform, and without moving it outside that cluster, one can access and slice all the datasets in many ways. As such, end users can create new analytics and querying capabilities across these diverse datasets for new insights not achievable when the original data was kept in separate silos.

SUMMARY

According to one embodiment, a method to search for at least one relationship pattern in a plurality of runtime artifacts is provided. The method may include detecting at least one data manipulation statement in the plurality of runtime artifacts. The method may also include extracting at least one relationship clause from at least one data manipulation statement. The method may further include parsing at least one extracted relationship clause. The method may include generating at least one normalized syntax tree based on at least one parsed relationship clause. The method may also include performing a classification and a snippet discovery on at least one generated normalized syntax tree.

According to another embodiment, a computer system to search for at least one relationship pattern in a plurality of runtime artifacts is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include detecting at least one data manipulation statement in the plurality of runtime artifacts. The method may also include extracting at least one relationship clause from at least one data manipulation statement. The method may further include parsing at least one extracted relationship clause. The method may include generating at least one normalized syntax tree based on at least one parsed relationship clause. The method may also include performing a classification and a snippet discovery on at least one generated normalized syntax tree.

According to yet another embodiment, a computer program product to search for at least one relationship pattern in a plurality of runtime artifacts is provided. The computer program product may include one or more computer-readable storage devices and program instructions stored on at least one of the one or me tangible storage devices, the program instructions executable by a processor. The computer program product may include program instructions to detect at least one data manipulation statement in the plurality of runtime artifacts. The computer program product may also include program instructions to extract at least one relationship clause from at least one data manipulation statement. The computer program product may further include program instructions to parse at least one extracted relationship clause. The computer program product may include program instructions to generate at least one normalized syntax tree based on at least one parsed relationship clause. The computer program product may also include program instructions to perform a classification and a snippet discovery on at least one generated normalized syntax tree.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
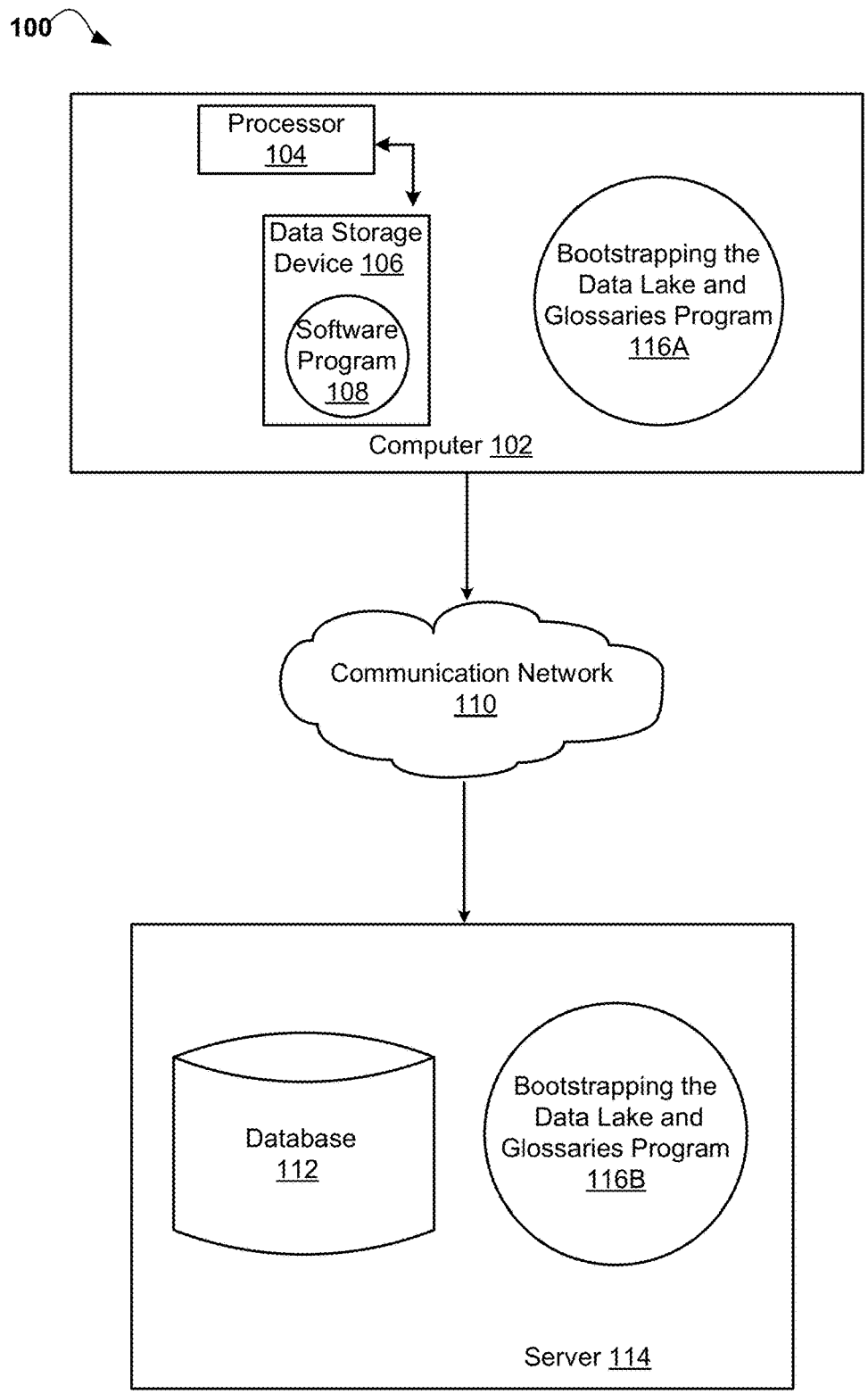
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to big data platforms. The following described exemplary embodiments provide a system, method and program product to, among other things, bootstrap the data lake and glossaries with 'dataset joins' metadata from existing application patterns. Therefore, the present embodiment has the capacity to improve the technical field of big data platforms by providing a framework to mine the relationship patterns from different runtime artifacts (e.g., SQL packets sent between 2 systems, a MQ message including a SQL statement, etc.). More specifically, the present embodiment may improve big data platforms by providing a bootstrap classification of useful relationships that can then be leveraged with the data lakes or discovery tools. Additionally, the present embodiment may store the results in a business glossary equivalent or a Metadata repository where a user can link the relationships to business level entities.

As previously described, big data platforms will receive multiple datasets originated from various sources. The data is located on that one platform, and without moving it outside that cluster, one can access and slice all the datasets in many ways. As such, end users can create new analytics and querying capabilities across these diverse datasets for new insights not achievable when the original data was kept in separate silos. The current approach is to use a search mechanism to find the data elements (e.g., RDBMS columns or tables, XML elements and attributes, or CSV fields, etc.) that the user may want to include in their analysis by joining or aggregating. However, the drawback of the current approach is that it doesn't take into consideration the already known application patterns embedded in many data runtimes (for example structured query language (SQL), XQuery, SPARQL query statements contained in ETL, batch, reports, RDBMS views, Java or C applications, etc.). These application patterns (SQL predicates or XPath expressions for instance or ETL in-memory join construct) would be really useful as a bootstrapping mechanism to help the end user understand how to join different sources of data accurately (and proven with existing applications).

Some tools already exist in the RDBMS domain that discover referential integrity or some fairly complex join transformations, such as the IBM Infosphere Discovery. However, the IBM Infosphere Discovery mainly encompasses simple key(s) discovery by looking at data distribution between 2 tables and not about complex joins across multiple tables implemented in application and within different runtimes. Another example of this technique is Composite Discovery from Cisco. However, Composite Discovery is also based on data catalogue and data distribution techniques. Even with the Discovery Transformation Analyzer, the base line for this automatic discovery is by performing value analysis in the columns and cross columns and generating extra DataMapper tables. However, this does not solve the problems where values are created on the fly as the software cannot really infer the transformation rule from the data alone as they are not stored in a table (for instance SUBSTR(X, 1,6)||substr(coalesce(y),5,8) to create a UK Bank account number.).

Furthermore, it is not often possible to derive a transformation rule from the final results sets as the original semantic of the transformation is not normally captured in the final data (i.e., non-homomorphic relation). However, these complicated relationships between data from different sources (e.g., JOIN patterns (maybe requiring more than 2 tables) for RDBMS) are often already coded in applications, ETL, Batch and reporting runtimes. Therefore, if the datasets to be joined in the data lakes require new joins as they should be, one can still leverage existing knowledge of relationships between datasets as this may enhance the inter-dataset joins with well-known intra-dataset ones. As such, it may be advantageous, among other things, to provide a new framework to mine the relationship patterns from different runtimes and provide a bootstrap classification of useful relationships that can then be leveraged with the data lakes or discovery tools.

According to at least one implementation, the present embodiment may mine existing relationship patterns from applications and runtimes (either by SQL capture on live connections, such as IBM's Optim Database Relationship Analyzer, looking at scripts, SQL views or source code files) to bootstrap the data lake process. Additionally, the present embodiment may store the results in a business glossary equivalent where one can link the relationships to business level entities (for instance to get to CUSTOMER from BRANCHES one would need to join with TRANSACTIONS tables).

As such, the present embodiment may gather all source data manipulation statements from different runtimes by using SQL capture on live JDBC/ODBC connections with tooling or directly looking at source code in files or database metadata catalogues.

Additionally, the present embodiment may extract from these data manipulation statements the relationship clauses. Then the method may parse these clauses and build normalized syntax trees (for instance removing recurring variables i.e., customerID=25005 should be transformed into customerId=<value>). Next, the method may perform classification and snippet discovery; classify all the relationships; extract common relationship parts linking multiple data sources together and cluster them using analytics algorithms; propose the list of relationships to Information Technology (IT) or business user validation if required when there is no clear term associated with this so they can be stored in a business or IT glossary (the business term can often be found by looking before and after the SQL in comments or annotations and doing some text analytics extraction looking for a token that exists in the metadata (table names, concepts, business terms . . . )); and provide a search capability to retrieve the more likely relationships between data elements or business terms, or both for usage by IT persons or business users.

According to the present embodiment, the data derived by this capability is derived from real applications patterns which may be more accurate than basing this from final datasets. Furthermore, the present embodiment may complement existing discovery solutions by providing a more solid set of relationship rules up front.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to bootstrap the data lake and glossaries with 'dataset joins' metadata from existing application patterns. As such, the present embodiment may mine existing relationship patterns from applications and runtimes to bootstrap the data lake process. Additionally, the present embodiment may store the results in a business glossary or metadata store equivalent where one can link the relationships to business level entities.

According to at least one implementation, the present embodiment may capture the necessary SQL source statements from a data source; prepare the data by parsing the source to extract SQL snippets; extract WHERE and FROM clauses; aggregate PARSE trees and normalize them (i.e., variable or constants elimination); classify part of the tree and discover common snippets in a way to apply such analytics for clustering relationships and collections together.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a Bootstrapping the Data Lake and Glossaries Program 116A. The networked computer environment 100 may also include a server 114 that is enabled to run a Bootstrapping the Data Lake and Glossaries Program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Bootstrapping the Data Lake and Glossaries Program 116B running on server computer 114 via the communications network 110. The communications network 110 may include connections, such as wire, wireless communication links, or fiber optic cables. As will be discussed with reference to FIG. 5, server computer 114 may include internal components 502a and external components 504a, respectively, and client computer 102 may include internal components 502b and external components 504b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Bootstrapping the Data Lake and Glossaries Program 116A, 116B may interact with a database 112 that may be embedded in various storage devices, such as, but not limited to a mobile device 102, a networked server 114, or a cloud storage service.

As previously described, the client computer 102 may access the Bootstrapping the Data Lake and Glossaries Program 116B, running on server computer 114 via the communications network 110. For example, a user using a client computer 102 may utilize the Bootstrapping the Data Lake and Glossaries Program 116A, 116B to bootstrap the data lake and glossaries with 'dataset joins' metadata from existing application patterns. As such, the Bootstrapping the Data Lake and Glossaries Program 116A, 116B may mine existing relationship patterns from applications and runtimes to bootstrap the data lake process. Additionally, the Bootstrapping the Data Lake and Glossaries Program 116A, 116B may store the results in a business glossary equivalent, such as a database 112 where a user can link the relationships to business level entities. The Bootstrapping the Data Lake and Glossaries method is explained in more detail below with respect to FIGS. 2-4.

Figure 2:
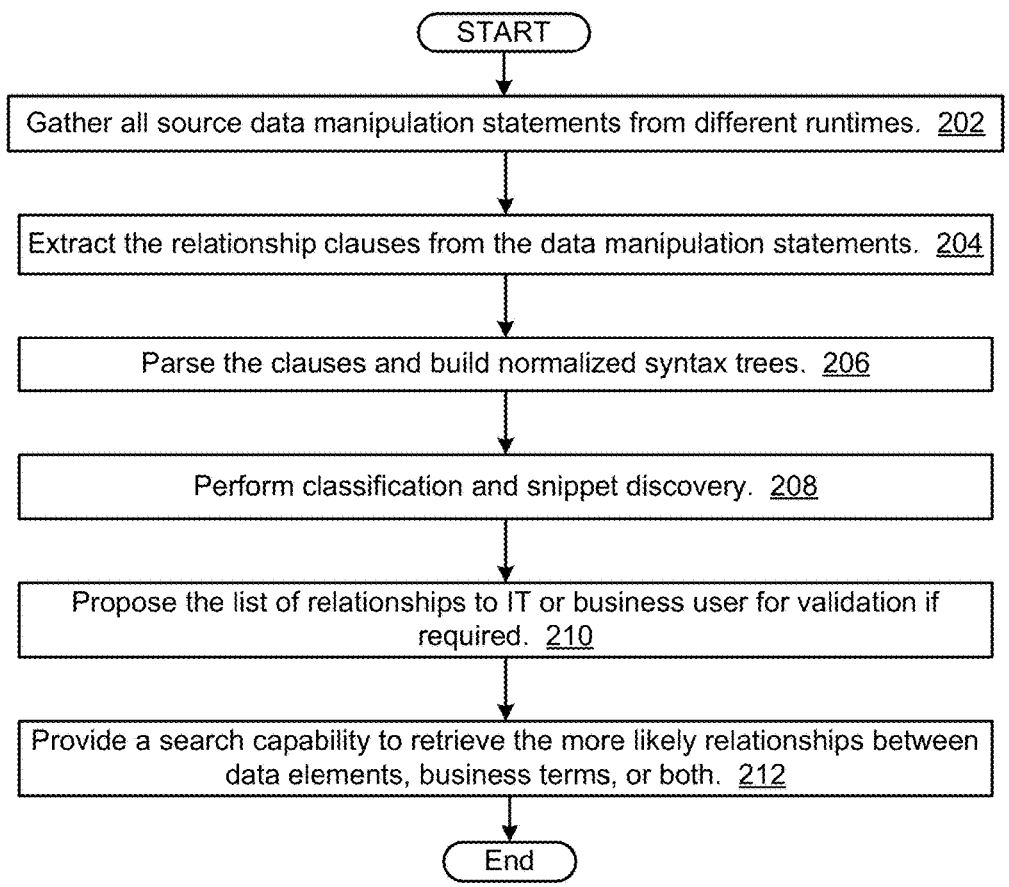
FIG. 2 is an operational flowchart illustrating the steps carried out by a program for bootstrapping the data lake and glossaries with 'dataset joins' metadata from existing application patterns according to at least one embodiment.

Referring now to FIG. 2, an operational flowchart 200 illustrating the steps carried out by a program for bootstrapping the data lake and glossaries with 'dataset joins' metadata from existing application patterns according to at least one embodiment is depicted. As previously described, a user using a client computer 102 (FIG. 1) may utilize the Bootstrapping the Data Lake and Glossaries Program 116A, 116B (FIG. 1) to bootstrap the data lake and glossaries with 'dataset joins' metadata from existing application patterns.

Therefore, with respect to FIG. 2 at 202, the Bootstrapping the Data Lake and Glossaries Program 116A, 116B (FIG. 1) will gather all source data manipulation statements from different runtimes. As such, according to at least one implementation all source data manipulation, such as SQL statements will be detected and gathered from different runtimes (e.g., ETL, Database Views, database SQL procedures, Batch files, reporting tools metadata, metadata servers, programs and scripts) by using SQL capture on live JDBC/ODBC connections with tooling, such as Optim (or an equivalent) or directly looking at the source code in files or the database metadata catalogues.

Then at 204, the Bootstrapping the Data Lake and Glossaries Program 116A, 116B (FIG. 1) will extract the relationship clauses from the manipulation statements (i.e., from each of the detected data manipulation statements). For example, for the SQL predicate clauses, the relationship clauses, such as the (WHERE . . . ) and FROM clauses (FROM Table 1, TABLE 2 . . . ) may be extracted from the data manipulation statements.

Next at 206, the Bootstrapping the Data Lake and Glossaries Program 116A, 116B (FIG. 1) will parse the extracted relationship clauses and build normalized syntax trees. Then at 208, the Bootstrapping the Data Lake and Glossaries Program 116A, 116B (FIG. 1) will perform classification and snippet discovery. Therefore, according to at least one implementation, the Bootstrapping the Data Lake and Glossaries Program 116A, 116B (FIG. 1) may classify all the relationships (e.g., uni- or bi-directional, or mapping), extract common relationship parts which link multiple data sources together, and cluster the extracted common relationship parts using analytics algorithms, such as KMeans or other analytic algorithms.

Next at 210, the Bootstrapping the Data Lake and Glossaries Program 116A, 116B (FIG. 1) will propose the list of relationships to Information Technology (IT) or business user for validation if required (i.e., below a certain certainty threshold) so they can be stored in a business or IT glossary. According to at least one implementation, the relationship clauses and linkages may be stored in a repository 112 (FIG. 1) linking the relationship clauses by class, cluster, and tree.

Then at 212, the Bootstrapping the Data Lake and Glossaries Program 116A, 116B (FIG. 1) will provide a search capability to retrieve the more likely relationships between data elements, business terms, or both. For example, such a search may be, "show the join predicates between business term CUSTOMER and ACCOUNTS". As such, the results may be a sorted list of the most common predicate used including the most common intermediate tables required to link the 2 tables if necessary. As previously described, the present embodiment may derive results from real applications patterns which may be more accurate than basing results from final datasets. Furthermore, the present embodiment may complement existing discovery solutions by providing a more solid set of relationship rules up front.

It may be appreciated that FIG. 2 provides only an illustration of one implementation and does not imply any limitations with regard to how different embodiments may be implemented. Many modifications to the depicted environments may be made based on design and implementation requirements. For example, the Bootstrapping the Data Lake and Glossaries Program 116A, 116B (FIG. 1) may also add SQL statement capture from runtimes, such as Optim, since such tools capture the SQL transferring from applications to database servers by monitoring the interactions between them. Although it may be common to use this capability for capturing a SQL workload and replaying it later on a test data base, according to at least one implementation, the present embodiment can leverage this SQL workload monitoring to capture all the information that is needed from the runtimes as the systems are running, without any impact and without requiring access to the source code or the applications. Having access to the source code of all applications may not always possible by current technologies since many applications are deployed as binaries only (e.g., 3rd party, COTS . . . ). However, according to at least one implementation, the present embodiment may capture the source code's access to such information.

Figure 3:
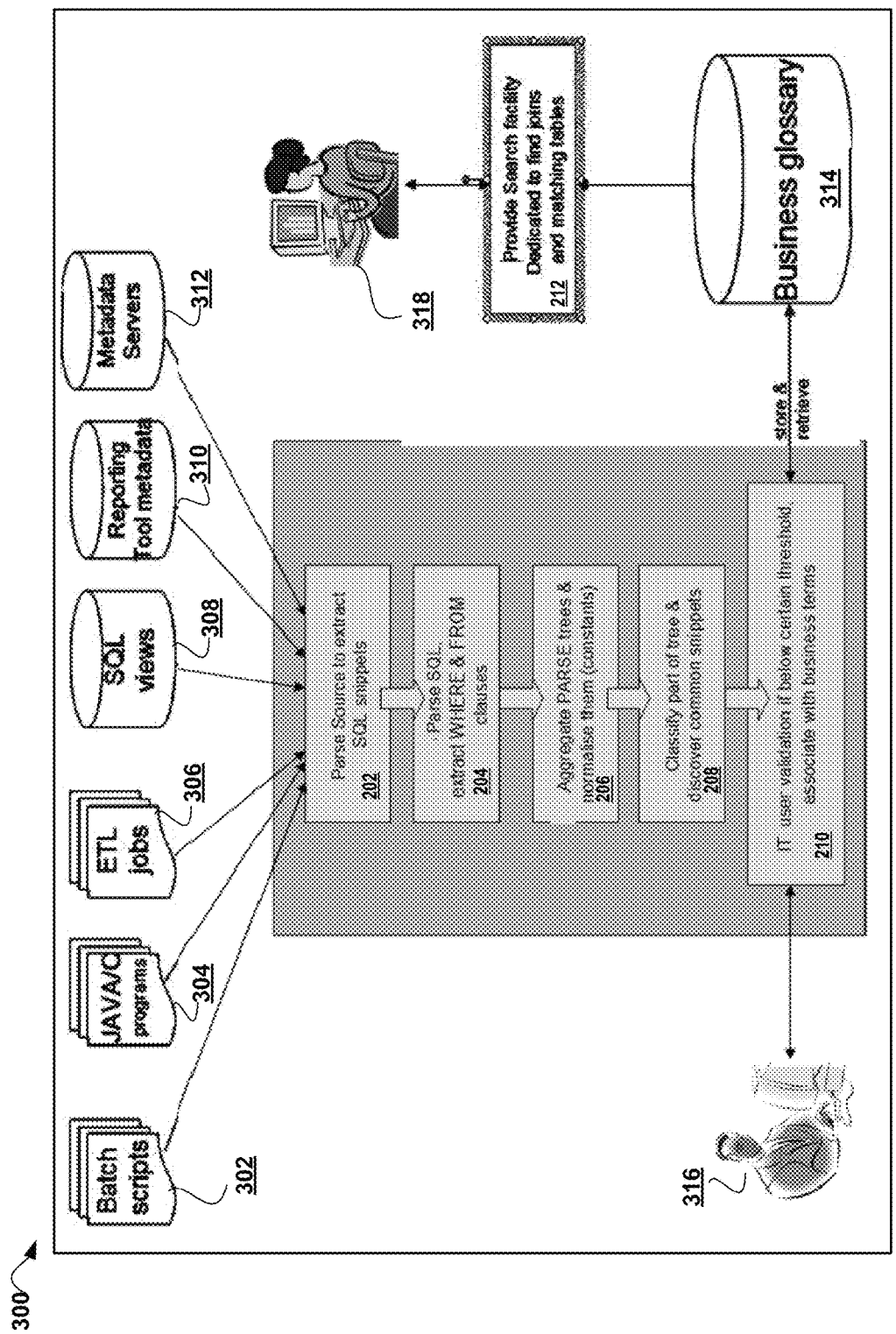
FIG. 3 is an exemplary illustration of a system flow diagram for bootstrapping the data lake and glossaries with 'dataset joins' metadata from existing application patterns according to at least one embodiment.

Referring now to FIG. 3, an exemplary illustration 300 of a system flow diagram for bootstrapping the data lake and glossaries with 'dataset joins' metadata from existing application patterns in accordance with one embodiment is depicted. For example purposes only, RDMS is used with respect to FIG. 3. According to at least one implementation, the present embodiment may capture the right SQL source statements, preparing the data in a way so that part of the tree is classified and common snippets are discovered. As such, the analytics may be applied for clustering relationships and collections together.

As previously explained in detail with respect to FIG. 2, data is detected and gathered from sources at 202 and the source data is parsed to extract SQL snippets. As such, according to at least one implementation, all source data manipulation, such as SQL statements may be gathered from different runtimes, such as Batch scripts 302, Java/C programs 304, ETL jobs 306, SQL views 308, reporting tools metadata 310, and metadata servers 312. ETL jobs that do in-memory joins capabilities (without any SQL statements) can also be extracted and used in the same way.

Then at 204, the method will extract the relationship clauses from each of the detected manipulation statements. For example, the method may parse the SQL statements and extract the WHERE and FROM clauses.

Next, at 206, the method will aggregate the PARSE trees and normalize them (i.e., replacing variable and constants to generalize the clauses). Therefore, the extracted relationship clause may be parsed to generate normalized syntax trees.

Then at 208, the method will perform classification on the tree and perform snippet discovery. As such, the extracted relationship clauses may be grouped into different classes and common relationship clauses may link groups of data sources together.

Then at 210, the method will propose the list of relationships to Information Technology (IT) or business user 316 for validation if required so they can be stored in a business or IT glossary 314.

Next at 212, the method will provide a user 318 with a search facility dedicated to find joins and matching tables. As such, the method may provide a search capability to retrieve the more likely relationships between data elements, business terms, or both.

Figure 4:
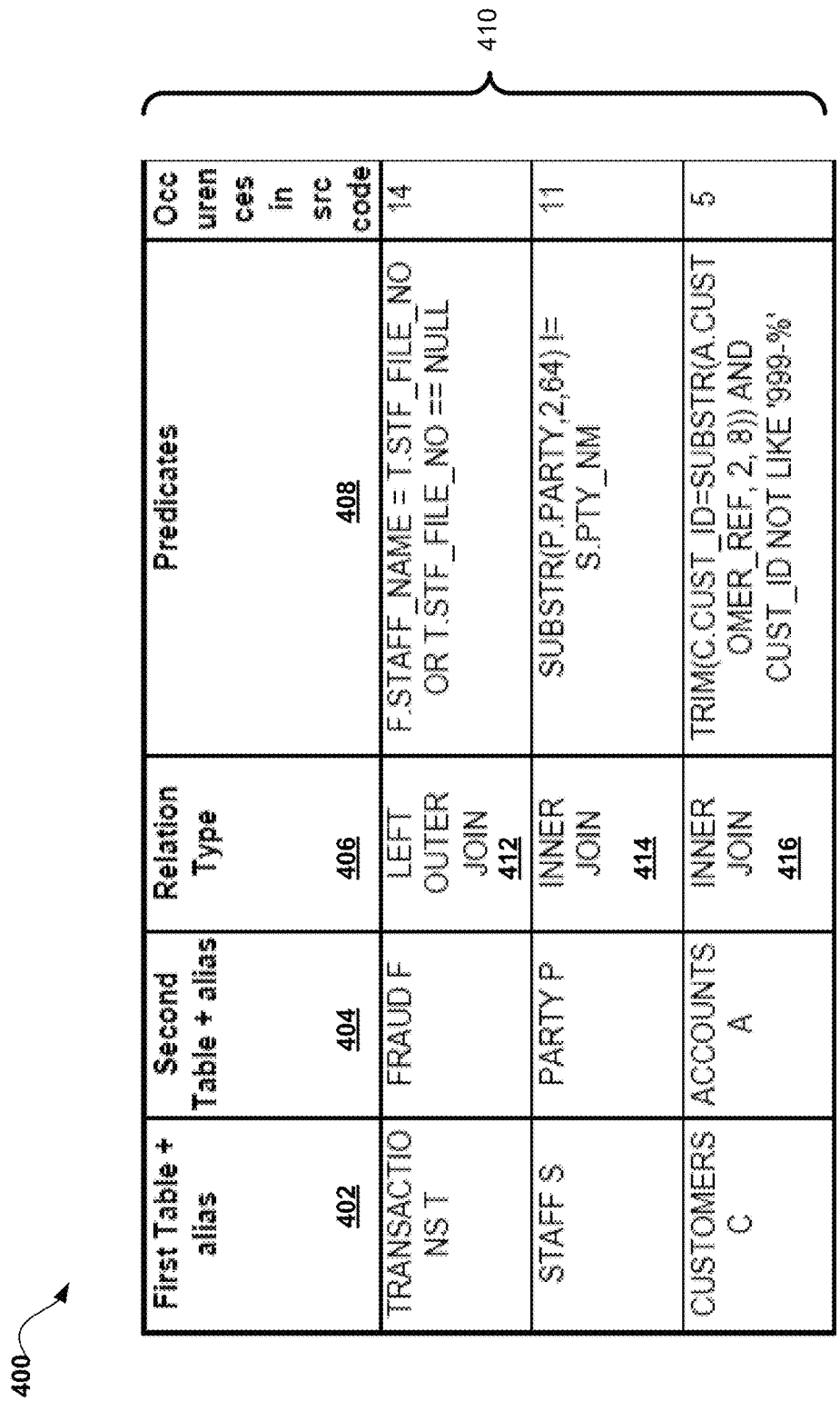
FIG. 4 is an exemplary illustration of decomposing 3 SQL queries into a tabular format including usage statistics ready for downstream analysis according to at least one embodiment.

Referring now to FIG. 4, an exemplary illustration 400 of decomposing 3 SQL queries into a tabular format including usage statistics ready for downstream analysis in accordance with one embodiment is depicted. Based on the algorithm previously described with respect to FIG. 2 and FIG. 3, FIG. 4 illustrates the description of the algorithm for the classification of predicates. As such, the table 400 shows how an SQL statement (or more) could be broken down into a tabular format upon analysis of the predicates. As such, the SQL statement may be broken down into a First Table+alias column 402; a Second Table+alias column 404; a Predicates column 408; a Relation Type column 406; and an Occurrences in source code column 410. The final column 410 (i.e., the Occurrences in source code column 410) indicates the frequency a specific relation 412-416 appears across the source code. Sorting this table by the last column 410 may show the most frequently used SQL relations found in the analyzed codebase for joins between 2 tables. The frequency table 400 of application patterns may also highlight where queries were being repeated and may perhaps make good candidates for a database view.

According to the present embodiment, in addition to simple frequency analysis (basic counting, up to including modified version of tf-idf or equivalent), more advanced analytical techniques may be employed to cluster or classify application patterns found in the source code. For example, a clustering algorithm such as k-means could be used to group similar application patterns together. Furthermore, another option may be to add labels to some existing application patterns, such as 'FINANCIAL_EVENTS', 'EMPLOYEE_EVENTS', 'CUSTOMER', and employ a machine learning approach to assign labels to unseen application patterns. Once some manual labels are in place, a previously unseen application pattern appearing in the source code could be scored by the machine learning algorithm (e.g., naïve bayes classifier) and automatically assign a label by the algorithm. Other current technologies, such as IBM's Information Discovery and Information Analyzer only look at the data and how the data's distribution match. Such tools can infer a few add-on predicates, however, the present embodiment may mine application code to find the relevant predicates.

Figure 5:
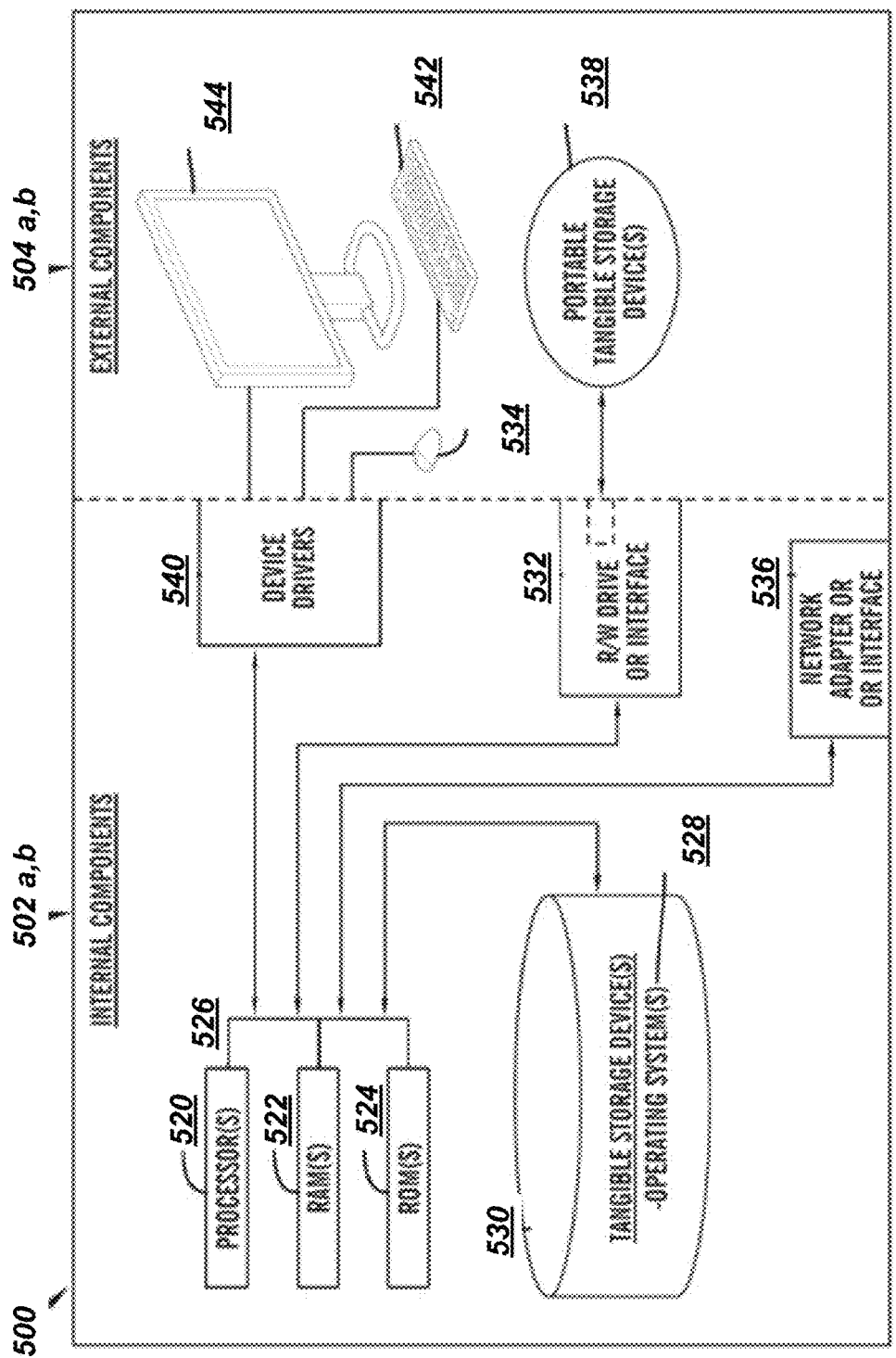
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 502, 504 is representative of any electronic device capable of executing machine-readable program instructions. Data processing system 502, 504 may be representative of a smart phone, a computer system, PDA, or other electronic devices. Examples of computing systems, environments, and/or configurations that may represented by data processing system 502, 504 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 502 a,b and external components 504 a,b illustrated in FIG. 5. Each of the sets of internal components 502 include one or more processors 520, one or more computer-readable RAMs 522 and one or more computer-readable ROMs 524 on one or more buses 526, and one or more operating systems 528 and one or more computer-readable tangible storage devices 530. The one or more operating systems 528 and the Software Program 108 (FIG. 1) and the Bootstrapping the Data Lake and Glossaries Program 116A (FIG. 1) in client computer 102 (FIG. 1) and the Bootstrapping the Data Lake and Glossaries Program 116B (FIG. 1) in network server 114 (FIG. 1) are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the Software Program 108 (FIG. 1) and the Bootstrapping the Data Lake and Glossaries Program 116A, 116B (FIG. 1) can be stored on one or more of the respective portable computer-readable tangible storage devices 538, read via the respective R/W drive or interface 532 and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The Software Program 108 (FIG. 1) and the Bootstrapping the Data Lake and Glossaries Program 116A (FIG. 1) in client computer 102 (FIG. 1) and the Bootstrapping the Data Lake and Glossaries Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 536. From the network adapters or interfaces 536, the Software Program 108 (FIG. 1) and the Bootstrapping the Data Lake and Glossaries Program 116A (FIG. 1) in client computer 102 (FIG. 1) and the Bootstrapping the Data Lake and Glossaries Program 116B (FIG. 1) in network server 114 (FIG. 1) are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532 and network adapter or interface 536 comprise hardware and software (stored in storage device 530 and/or ROM 524).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to search for at least one relationship pattern in a plurality of runtime artifacts, the method comprising:
    detecting at least one data manipulation statement in the plurality of runtime artifacts;
    extracting at least one relationship clause from the detected at least one data manipulation statement;
    parsing the extracted at least one relationship clause; and
    generating at least one normalized syntax tree based on the parsed at least one relationship clause.

2. The method of claim 1, further comprising:
    performing a classification and a snippet discovery on the generated at least one normalized syntax tree;
    clustering a plurality of common relationship clauses according to a plurality of linkages that link a plurality of data sources together; and
    storing the plurality of common relationship clauses and the plurality of linkages.

3. The method of claim 2, wherein the plurality of common relationship clauses and the plurality of linkages are stored according to at least one of a class, a cluster or a syntax tree.

4. The method of claim 2, further comprising:
    proposing a list comprising the clustered common relationship clauses to a user for validation; and
    providing a search capability to retrieve at least one probable relationship between at least one of a plurality of data elements, a plurality of business terms, and a plurality of data elements and business terms, wherein the retrieved at least one probable relationship includes a sorted list of a most common predicate used.

5. The method of claim 1, wherein the plurality of runtime artifacts is associated with a data source comprising at least one of an ETL, a database view, a database SQL procedure, a batch file, a plurality of reporting tool metadata, a metadata server, a program, and a script.

6. The method of claim 2, wherein performing a classification comprises classifying a plurality of common relationship clauses according to at least one of a uni-directional classification, a bi-directional classification, and a mapping classification.

7. The method of claim 2, wherein the clustering the plurality of common relationship clauses is performed using a plurality of analytic algorithms.

8. A computer system to search for at least one relationship pattern in a plurality of runtime artifacts, the computer system comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    detecting at least one data manipulation statement in the plurality of runtime artifacts;
    extracting at least one relationship clause from the detected at least one data manipulation statement;
    parsing the extracted at least one relationship clause; and
    generating at least one normalized syntax tree based on the parsed at least one relationship clause.

9. The computer system of claim 8, further comprising:
performing a classification and a snippet discovery on the generated at least one normalized syntax tree;
clustering a plurality of common relationship clauses according to a plurality of linkages that link a plurality of data sources together; and
storing the plurality of common relationship clauses and the plurality of linkages.

10. The computer system of claim 9, wherein the plurality of common relationship clauses and the plurality of linkages are stored according to at least one of a class, a cluster or a syntax tree.

11. The computer system of claim 9, further comprising:
proposing a list comprising the clustered common relationship clauses to a user for validation; and
providing a search capability to retrieve at least one probable relationship between at least one of a plurality of data elements, a plurality of business terms, and a plurality of data elements and business terms, wherein the retrieved at least one probable relationship includes a sorted list of a most common predicate used.

12. The computer system of claim 8, wherein the plurality of runtime artifacts is associated with a data source comprising at least one of an ETL, a database view, a database SQL procedure, a batch file, a plurality of reporting tool metadata, a metadata server, a program, and a script.

13. The computer system of claim 9, wherein performing a classification comprises classifying a plurality of common relationship clauses according to at least one of a uni-directional classification, a bi-directional classification, and a mapping classification.

14. The computer system of claim 9, wherein the clustering the plurality of common relationship clauses is performed using a plurality of analytic algorithms.

15. A computer program product, to search for at least one relationship pattern in a plurality of runtime artifacts, the computer program product comprising:
one or more computer-readable storage devices and program instructions stored on at least one of the one or more tangible storage devices, the program instructions executable by a processor, the program instructions comprising:
program instructions to detect at least one data manipulation statement in the plurality of runtime artifacts;
program instructions to extract at least one relationship clause from the detected at least one data manipulation statement;
program instructions to parse the extracted at least one relationship clause; and
program instructions to generate at least one normalized syntax tree based on the parsed at least one relationship clause.

16. The computer program product of claim 15, further comprising:
program instructions to perform a classification and a snippet discovery on the generated at least one normalized syntax tree;
program instructions to cluster a plurality of common relationship clauses according to a plurality of linkages that link a plurality of data sources together; and
program instructions to store the plurality of common relationship clauses and the plurality of linkages.

17. The computer program product of claim 16, wherein the plurality of common relationship clauses and the plurality of linkages are stored according to at least one of a class, a cluster or a syntax tree.

18. The computer program product of claim 16, further comprising:
program instructions to propose a list comprising the clustered common relationship clauses to a user for validation; and
program instructions to provide a search capability to retrieve at least one probable relationship between at least one of a plurality of data elements, a plurality of business terms, and a plurality of data elements and business terms, wherein the retrieved at least one probable relationship includes a sorted list of a most common predicate used.

19. The computer program product of claim 15, wherein the plurality of runtime artifacts is associated with a data source comprising at least one of an ETL, a database view, a database SQL procedure, a batch file, a plurality of reporting tool metadata, a metadata server, a program, and a script.

20. The computer program product of claim 16, wherein performing a classification comprises classifying a plurality of common relationship clauses according to at least one of a uni-directional classification, a bi-directional classification, and a mapping classification.

* * * * *